(12) United States Patent
Smith et al.

(10) Patent No.: US 8,589,919 B2
(45) Date of Patent: Nov. 19, 2013

(54) TRAFFIC FORWARDING FOR VIRTUAL MACHINES

(75) Inventors: Michael Smith, San Jose, CA (US); Anusankar Elangovan, San Francisco, CA (US); Paul Fazzone, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1011 days.

(21) Appl. No.: 12/387,174

(22) Filed: Apr. 28, 2009

(65) Prior Publication Data

US 2010/0275199 A1    Oct. 28, 2010

(51) Int. Cl.
*G06F 9/455*    (2006.01)
(52) U.S. Cl.
USPC ............................... 718/1; 718/104
(58) Field of Classification Search
None
See application file for complete search history.

(56) References Cited

U.S. PATENT DOCUMENTS

| | | | |
|---|---|---|---|
| 2003/0014524 A1 | 1/2003 | Tormasov | |
| 2006/0206300 A1* | 9/2006 | Garg et al. | 703/27 |
| 2006/0230407 A1 | 10/2006 | Rosu et al. | |
| 2007/0028244 A1 | 2/2007 | Landis et al. | |
| 2007/0036178 A1* | 2/2007 | Hares et al. | 370/490 |
| 2007/0127376 A1 | 6/2007 | Chao et al. | |
| 2009/0083445 A1 | 3/2009 | Ganga | |
| 2009/0222567 A1* | 9/2009 | Tripathi et al. | 709/230 |
| 2010/0131636 A1* | 5/2010 | Suri et al. | 709/224 |
| 2010/0242045 A1* | 9/2010 | Swamy et al. | 718/104 |

FOREIGN PATENT DOCUMENTS

| | | |
|---|---|---|
| WO | WO 2005/083946 A1 | 9/2005 |
| WO | WO 2009/042397 A1 | 4/2009 |

OTHER PUBLICATIONS

"Cisco VN-Link: Virtualization-Aware Networking", Mar. 2009, pp. 1-10.

* cited by examiner

*Primary Examiner* — Emerson Puente
*Assistant Examiner* — Dong Kim
(74) *Attorney, Agent, or Firm* — Cindy Kaplan

(57) ABSTRACT

In one embodiment, an apparatus configured for communication with a plurality of virtual machines includes a virtual switch in communication with one or more of the virtual machines, an interface in communication with one or more of the virtual machines and configured for communication with a hardware implemented switch, and a mode selector for assigning to each of the virtual machines, a mode of operation for forwarding data from the virtual machine and switching the assigned mode of operation at one or more of the virtual machines. The mode of operation is selected from a first mode wherein the data is forwarded by the hardware implemented switch and a second mode wherein the data is forwarded by the virtual switch.

20 Claims, 5 Drawing Sheets

TRAFFIC FORWARDING FOR VIRTUAL MACHINES

BACKGROUND OF THE INVENTION

The present disclosure relates generally to communication networks, and more particularly, to forwarding traffic in a virtual machine environment.

Data centers often use a small percentage of available CPU, storage, and memory capacity. This results in deployment of more servers than are necessary to perform a specified amount of work. Additional servers increase costs and create a more complex and disparate environment that can be difficult to manage. Many data center managers are turning to virtualization so that resources can be shared across a network.

Virtualization is a technology which allows one computer to do the job of multiple computers by sharing resources of a single computer across multiple systems. Through the use of virtualization, multiple operating systems and applications can run on the same computer at the same time, thereby increasing utilization and flexibility of hardware. Virtualization allows servers to be decoupled from underlying hardware, thus resulting in multiple virtual machines sharing the same physical server hardware.

Since multiple virtual machines may reside on the same server, traffic forwarding is performed between virtual machines on the same server and virtual machines on different servers.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
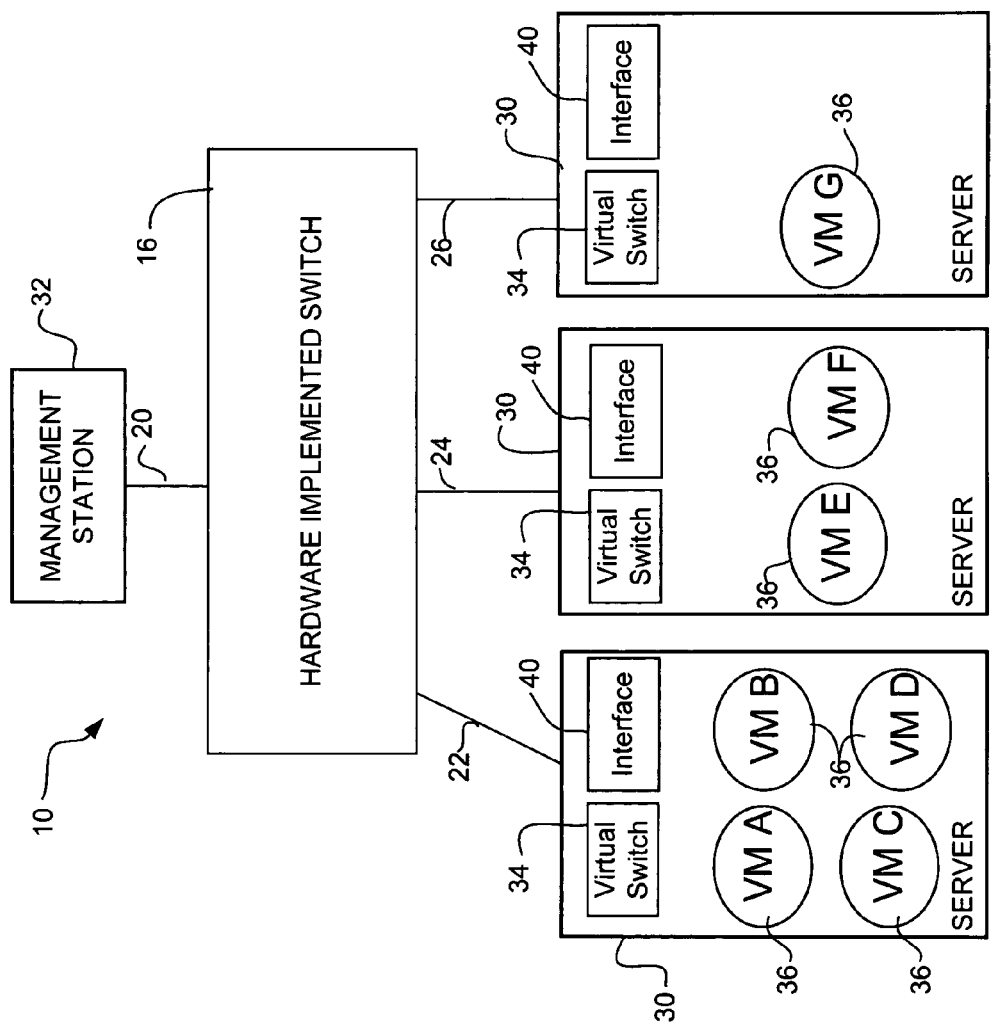
FIG. 1 illustrates an example of a network in which embodiments described herein may be implemented.

In one embodiment, a method generally comprises communicating with a plurality of virtual machines located at a network device, assigning to each of the virtual machines, a mode of operation for forwarding data from the virtual machine and switching the assigned mode of operation at one or more of the virtual machines. The mode of operation is selected from a first mode wherein data is forwarded by a hardware implemented switch and a second mode wherein data is forwarded by a virtual switch at the network device.

In another embodiment, an apparatus configured for communication with a plurality of virtual machines generally comprises a virtual switch in communication with one or more of the virtual machines, an interface in communication with one or more of the virtual machines and configured for communication with a hardware implemented switch, and a mode selector for assigning to each of the virtual machines, a mode of operation for forwarding data from the virtual machine and switching the assigned mode of operation at one or more of the virtual machines. The mode of operation is selected from a first mode wherein data is forwarded by the hardware implemented switch and a second mode wherein data is forwarded by the virtual switch. The virtual machines in communication with the interface are in the first mode of operation and the virtual machines in communication with the virtual switch are in the second mode of operation Example Embodiments The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, features relating to technical material that is known in the technical fields related to the invention have not been described in detail.

Virtualization allows one computer to do the job of multiple computers by sharing the resources of a single computer across multiple systems. Software is used to virtualize hardware resources of a computer, including, for example, the CPU, RAM, hard disk, and network controller, to create a virtual machine that can run its own operating system and applications. Multiple virtual machines share hardware resources without interfering with each other so that several operating systems and applications can be run at the same time on a single computer. Virtual machines may be used, for example, in a virtual infrastructure to dynamically map physical resources to business needs. Virtualization thus enables the aggregation of multiple servers, storage infrastructure, and networks into shared resources that can be delivered dynamically to applications as needed.

Traffic from the virtual machine may be forwarded to a virtual machine on the same physical machine or a different physical machine. As described in detail below, the traffic may be forwarded utilizing hardware forwarding (referred to herein as 'hardware mode' or 'first mode') or software switching (referred to herein as 'software mode' or 'second mode'). Embodiments described herein provide for the assignment of a mode to each virtual machine installed on the physical machine and transitioning of the virtual machines between modes.

The embodiments described herein operate in the context of a data communication network including multiple network elements. Some of the elements in a network that employs the system may be network devices such as servers, switches, or routers. The network device may include, for example, a master central processing unit (CPU), interfaces, and a bus. The CPU preferably includes memory and a processor. The network device may be implemented on a general purpose network machine such as described below.

Referring now to the drawings, and first to FIG. 1, an example of a network 10 that may implement embodiments described herein is shown. The network 10 may be configured for use as a data center or any other type of network. It is to be understood that the simplified network shown in FIG. 1 is only one example, and that the embodiments described herein may be employed in networks having different configurations and types of network devices.

The network 10 shown in FIG. 1 includes a network device 16 configured to provide control plane functionality to one or more network elements. The network device 16 may be a hardware implemented network switch (e.g., NEXUS series switch available from Cisco of San Jose, Calif.) or other network device configured to perform switching or routing functions. The switch 16 is configured to switch not only between physical ports, but also between virtual interfaces that are remote from the switch. In the example shown in FIG. 1, switch 16 is connected to three network devices (e.g., servers) 30 via links 22, 24, and 26. The switch 16 is physically independent (remote) from the servers 30. The switch 16 is also in communication via link 20 with a management station 32 (e.g., virtualization management platform such as VMware Virtual Center management station, available from VMware of Palo Alto, Calif.). The management station 32 or one or more management functions may also be integrated into the switch 16.

Each server 30 includes a virtual switch 34, interface (interface virtualizer) 40, and one or more virtual machines (VM A, VM B, VM C, VM D, VM E, VM F, VM G) 36. The virtual machines 36 share hardware resources without interfering with each other, thus enabling multiple operating systems and applications to execute at the same time on a single computer. A virtual machine monitor such as hypervisor (not shown) dynamically allocates hardware resources to the virtual machines 36. In the example of FIG. 1, VM A, VM B, VM C, and VM D are located on a first server, VM E and VM F are located on a second server, and VM G is located on a third server, each server being physically separate from the other servers. The virtual machines 36 may each be moved between servers 30. Migration ('VMotion') of the virtual machines 36 may be based on traffic patterns, hardware resources, or other criteria and may be performed dynamically.

The switch 16 includes one or more control planes (not shown). Each server 30 includes a plurality of data paths associated with the control planes. The data paths are each associated with a VNTag (virtual network tag). Each virtual machine 36 includes a virtual network interface card (VNIC) and virtual Ethernet interface associated with one of the servers 30. VNTag is used to tag Ethernet frames and control the virtual Ethernet interfaces of individual virtual machines in hardware mode. VNTags, VNICs, and virtual interfaces are described further below with respect to FIG. 2. For software switching, a data plane operates at the virtual switch 34 whereas for hardware forwarding, the data plane operates at the hardware implemented switch 16.

Limiting the forwarding of traffic between the virtual machines 36 to either software or hardware results in a number of drawbacks. For example, if packets were all forwarded by first sending the packet to the network device 16, this may result in traffic returning on the same physical interface on which it was transmitted (with a different VNTag) if the destination is a virtual machine 36 on the same physical server 30 (e.g., traffic transmitted between VM A and VM B in FIG. 1). This may constrain the bandwidth of inter-VM traffic within the same physical server if the traffic exceeds the physical bandwidth of uplink 22. In many cases, software switching is slower than hardware forwarding. However, under certain traffic conditions it is possible that hardware forwarding of traffic by the network device 16 is slower than software based switching. Another reason for using software switching rather than hardware forwarding is the limited availability of VNTags. Since the VNTag space on the switch 16 maps directly to hardware resources, there is a limit to the number of VNTags available. As described below, the virtual switch 34 may be configured to utilize the same VNTag for multiple virtual machines 36, therefore, maximizing VNTag space usage.

The embodiments described herein utilize both software switching and hardware forwarding (switching) to avoid the problems noted above and provide additional features. The embodiments allow the virtual interfaces of the virtual machines 36 to seamlessly transition from using hardware forwarding (first mode) to software switching (second mode) and vice versa.

Figure 2:
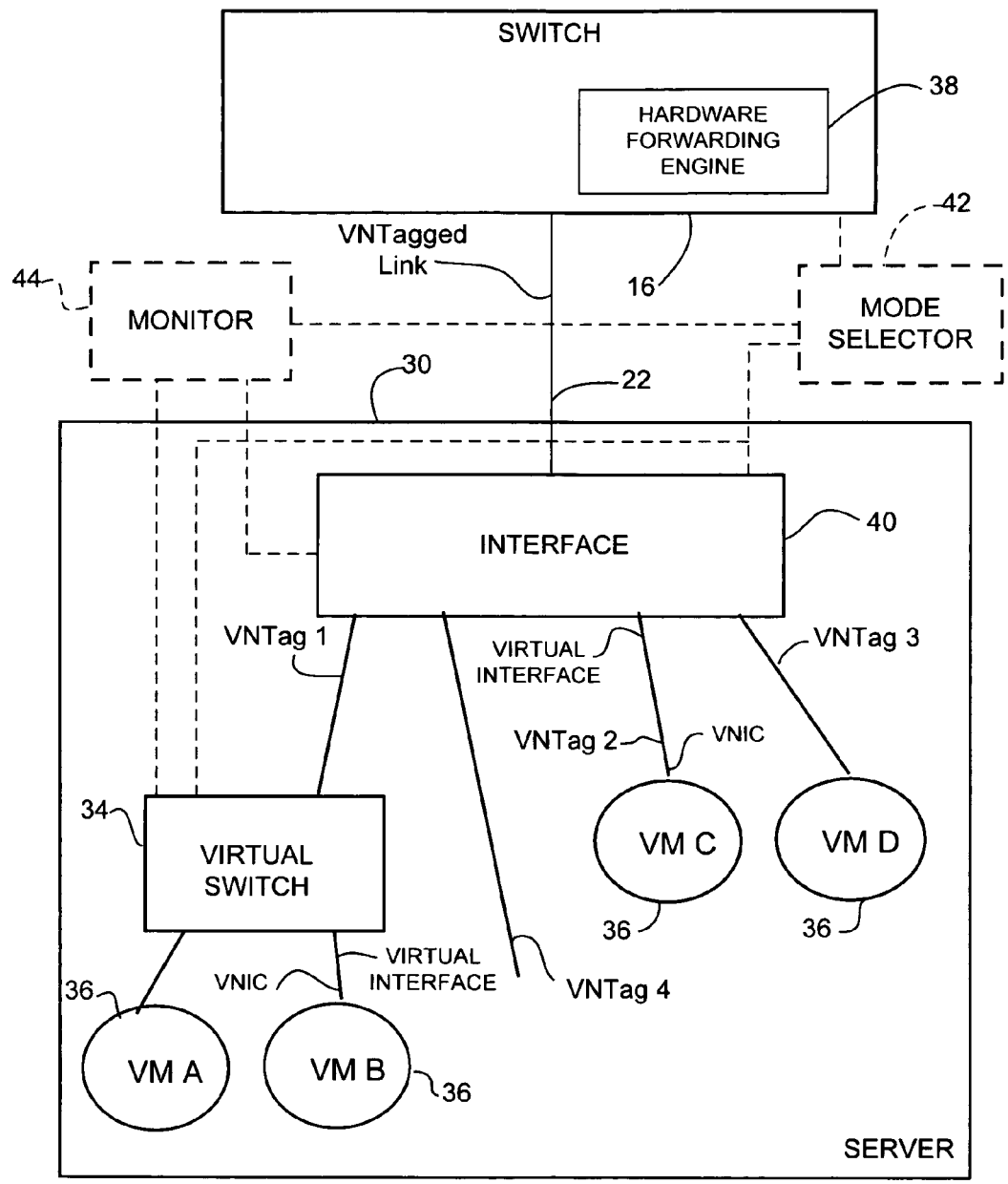
FIG. 2 illustrates details of a switch and server of the network of FIG. 1, according to one embodiment.

FIG. 2 illustrates details of the server 30 and hardware implemented switch 16 in accordance with one embodiment. The server 30 is connected to the switch 16 via VNTagged link 22. The switch 16 includes a hardware forwarding engine 38 which is remote (physically independent) from the server 30. In the example shown in FIG. 2, the server 30 includes four virtual machines 36 (VM A, VM B, VM C, VM D).

The interface 40 supports network interface virtualization and may be implemented in software (e.g., within a hypervisor on the server 30) or in hardware (e.g., network interface virtualizer adapter configured for hardware tagging and input/output virtualization). When the interface 40 receives traffic going from the server 30 to the network, the interface identifies the source VNIC and tags each of the packets generated by that VNIC with a corresponding VNTag (VNTag 1, VNTag 2, VNTag 3, VNTag 4, etc.). When the interface 40 receives traffic from the network, the interface removes the VNTag and directs the packet to the specified VNIC. The interface 40 does not perform any local switching between virtual machines 36. Switching is either performed by the hardware implemented switch 16 to which the interface 40 connects or by software based switching at the virtual switch 34.

In the example shown in FIG. 2, two of the virtual machines (VM A and VM B) are configured for software switching via the virtual switch 34. The virtual switch 34 transmits all of its network traffic upstream on a single VNTag while providing local switching and features for all virtual machine interfaces connected to the virtual switch. The VNICs logically connect each of the virtual machines 36 (VM A, VM B) to the virtual switch 34 and allow the virtual machine to send and receive traffic through the virtual interface. Virtual machines 36 located within the same server may communicate directly with one another via the virtual switch 34. For example, If VM A and VM B need to communicate with one another, the virtual switch 34 performs switching functions directly without the need to send traffic to the physical network. In the software mode, forwarding of packets is performed utilizing a software layer within the virtual switch 34 to insert a VNTag representing a particular VNIC wherein traffic is switched. The virtual machines 36 (VM A, VM B) that are configured for software switching utilize the same VNTag to maximize VNTag name space usage. In the example of FIG. 2, the interface 40 tags all packets received from the virtual switch 34 with VNTag 1.

Referring again to FIG. 2, two of the virtual machines (VM C, VM D) are configured for hardware forwarding. Each of these virtual machines 36 has their own VNTag associated therewith (VM C associated with VNTag 2, VM D associated with VNTag 3). VNTag 4 is shown as an example of a VNTag available to receive a new virtual machine 36. For example, one of the virtual machines (VM A or VM B) may have been previously associated with VNTag 4 and then switched to software mode.

In the hardware mode, forwarding of packets is performed by the hardware implemented switch 16. Data to be switched passes through a fabric of the switch 16 to the hardware forwarding engine 38 for processing. After the forwarding decision has been made, the engine 38 forwards the packet to the correct destination port (e.g., VNTagged link 22 and VNTag interface). In one embodiment, hardware acceleration is used to provide hardware accelerated forwarding.

A mode selector 42 is configured to select and assign the mode of operation for each virtual machine 36 (virtual interface). The mode selector 42 is in communication with the virtual machines 36 either directly or via the virtual switch 34 and interface 40. As described in detail below, the mode selector 42 may base its mode selection on information about the configuration or operation of the virtual machines 36. For example, a mode may be assigned to the virtual machine 36 based on traffic patterns. A monitor 44 collects and records traffic data and transmits the data to the mode selector 42. The mode selector 42 and monitor 44 may be installed on the same network device or different network devices, including for example, the server 30, network device 16, management station 32, or other network device. Also, each of the mode selector 42 and monitor 44 functions may be performed on two or more different network devices.

The forwarding mode may be configured statically or dynamically. Static assignment may be based on user configuration or remote configuration at the switch 16, management station 32, or other network device. Dynamic assignment may be based on one or more factors, including, for example, traffic patterns, configuration features, or preservation of VNTag number space. Each of these factors is described below.

In order to determine the best mode selection based on traffic patterns, traffic from each virtual machine is tracked by the monitor 44. In one embodiment bandwidth or packets are tracked and recorded for each destination address. By measuring traffic transmitted from each virtual machine 36 on a destination basis, it can be determined whether the majority of traffic is between virtual machines on the same physical server 30 or between virtual machines located on different servers. The monitor 44 may collect and record information utilizing software at the virtual switch 34 for each virtual machine 36 utilizing software switching. The monitor 44 may also be installed on the switch 16 or the interface 40 to track statistics for virtual machines 36 utilizing hardware forwarding. The monitor 44 communicates the traffic information to the mode selector 42 for use in selecting a mode of operation for each virtual machine 36.

Mode selection may also be based on configuration features of the virtual machine 36. For example, if a network interface feature exists only in software, software mode may be selected for the virtual machine 36. If the feature reaches a constraint, it may be desired to switch the virtual machine 36 from software mode to hardware mode. For example, if an ACL (access control list) is too large for software to achieve acceptable performance, the virtual machine 36 can be transitioned to hardware mode.

The selection of modes may also be based on optimization of the VNTag number space on each uplink 22, 24, 26. For example, VNTags may only be used for virtual machines 36 with heavy traffic between different servers. Also, if the VNTag space becomes fully allocated, a decision may be made to switch one or more of the virtual machines 36 to software mode. The decision as to which virtual machine 36 to transition may be made, for example, based on the amount of bandwidth utilized and network interface feature configurations at each server 30.

The virtual machine modes may be optimized upon the occurrence of an event (e.g., migration or 'VMotion' of a virtual machine 36 between servers 30, change in traffic patterns, etc.) or at periodic intervals. For example, there may be a large amount of traffic between VM A and VM E (FIG. 1). In order to optimize forwarding, VM A may be moved to the same server 30 as VM E. VM A and VM E may have initially been configured for hardware mode when they were located on different servers 30, due to the large amount of traffic between servers. After the move, it may be determined that VM A and VM E should be configured for software mode to take advantage of software switching at the virtual switch 34.

In one embodiment, the virtual machine 36 carries with it during the move information that can be used to make a decision as to whether the virtual machine should be configured for software or hardware mode. For example, the virtual machine 36 can provide traffic statistics or configuration features for use in deciding the mode of operation. Alternatively, upon receiving a new virtual machine 36 at the server 30, traffic can be tracked for use in deciding whether or not to switch the mode of operation of the virtual machine. The transition between modes may also occur concurrently with virtual machine migration. The system is preferably configured so that switching between modes at the virtual machines 36 does not occur too frequently. For example, if there is a period in which traffic patterns undergo a number of changes, switching between modes should not occur until the traffic patterns become more stable.

The decision to switch from software mode to hardware mode or vice versa may be done at the server 30, switch 16, management station 32, or other network device. If the decision is made at the server 30, the server informs the control plane at the switch 16 of the change in mode.

Figure 3:
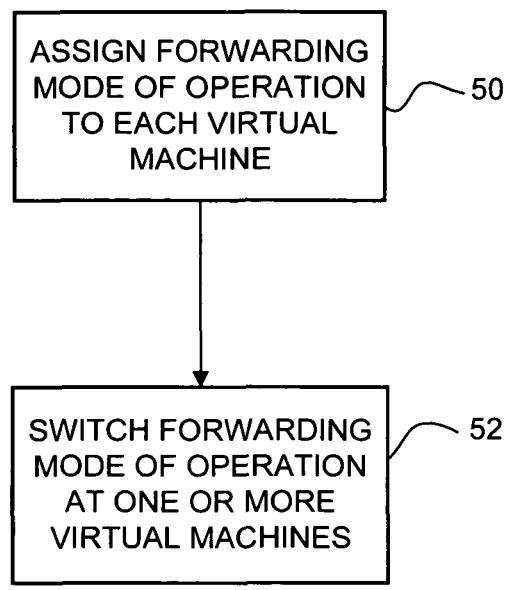
FIG. 3 is a flowchart illustrating an overview of a process for assigning a mode of operation on a per interface basis in a virtual machine environment, in accordance with one embodiment.

FIG. 3 is a flowchart illustrating an overview of a process for assigning a mode of operation on a per interface basis in a virtual machine environment. The mode selector 42 is in communication with a plurality of virtual machines 36 at the server 30. As previously described, the mode selector 42 may be in direct communication with the virtual machines 36 or in communication with the virtual machines through the virtual switch 34, interface 40, or other device. At step 50, the mode selector 42 assigns to each of the virtual machines, a mode of operation for forwarding data from the virtual machine. The mode of operation is selected from the first mode wherein data is transmitted to the hardware implemented switch 16 and the second mode wherein data is transmitted to the virtual switch 34 at the server 30. The mode may be user configured or may be selected based on one or more factors, as described above. The mode of operation may also be assigned based on a default policy. For example, when a virtual machine 36 moves to a new server 30, the mode selector 42 may automatically assign the same mode to the virtual machine as the virtual machine was previously set to before the move, or a default setting (e.g., first or second mode).

At step 52, the mode selector 42 switches the assigned mode of operation at one or more of the virtual machines 36. As described below with respect to FIG. 4, the switching may be performed dynamically based on information about the virtual machine 36. The switching may be initiated by a change in topology (e.g., move of a virtual machine from one server to another), change in traffic patterns, change in availability of hardware resources, or other occurrence.

Figure 4:
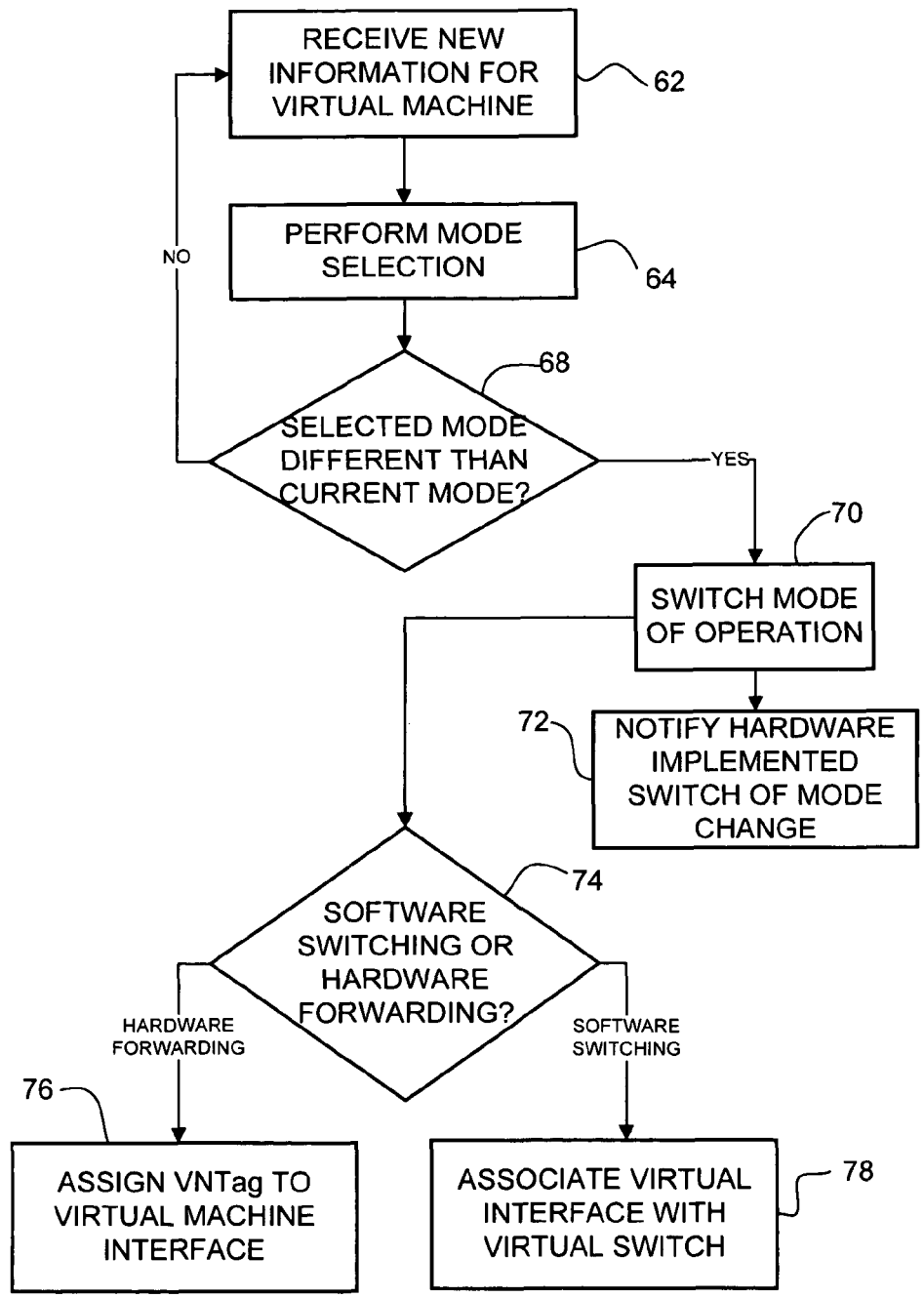
FIG. 4 is a flowchart illustrating a process for switching between modes of operation for forwarding data from a virtual machine, in accordance with one embodiment.

FIG. 4 is a flowchart illustrating details of a process for switching between modes of operation for forwarding data from virtual machines. At step 62, information about the virtual machine 36 is received. As described above, the information may include, for example, traffic patterns of data transmitted from the virtual machine, configuration of the virtual machine, availability of hardware resources, or other information. The information may be obtained from the virtual machine 36 or from other sources such as the management station 32, server 30, switch 16, or other network device. At step 64 a mode of operation is selected. At step 68 it is determined whether the mode selected is different from the current mode of operation at the virtual machine 36. If the mode is the same, no action is required until new information is received (e.g., upon occurrence of an event such as change in topology or traffic patterns). If the selected mode is different than the current mode, the virtual machine 36 changes its mode of operation (step 70). The hardware implemented switch 16 is also notified of the change (step 72). This step is not required if the decision to switch modes was made at the switch 16. If the mode is changed to hardware forwarding, a VNTag is assigned to the virtual machine 36 (steps 74 and 76). If the mode is changed to software switching, the virtual interface and virtual machine 36 are associated with the virtual switch 34 (steps 74 and 78).

It is to be understood that the processes illustrated in FIGS. 3 and 4 are provided as examples and that steps may be added or deleted, or the order of steps may be changed, without departing from the scope of the invention.

Figure 5:
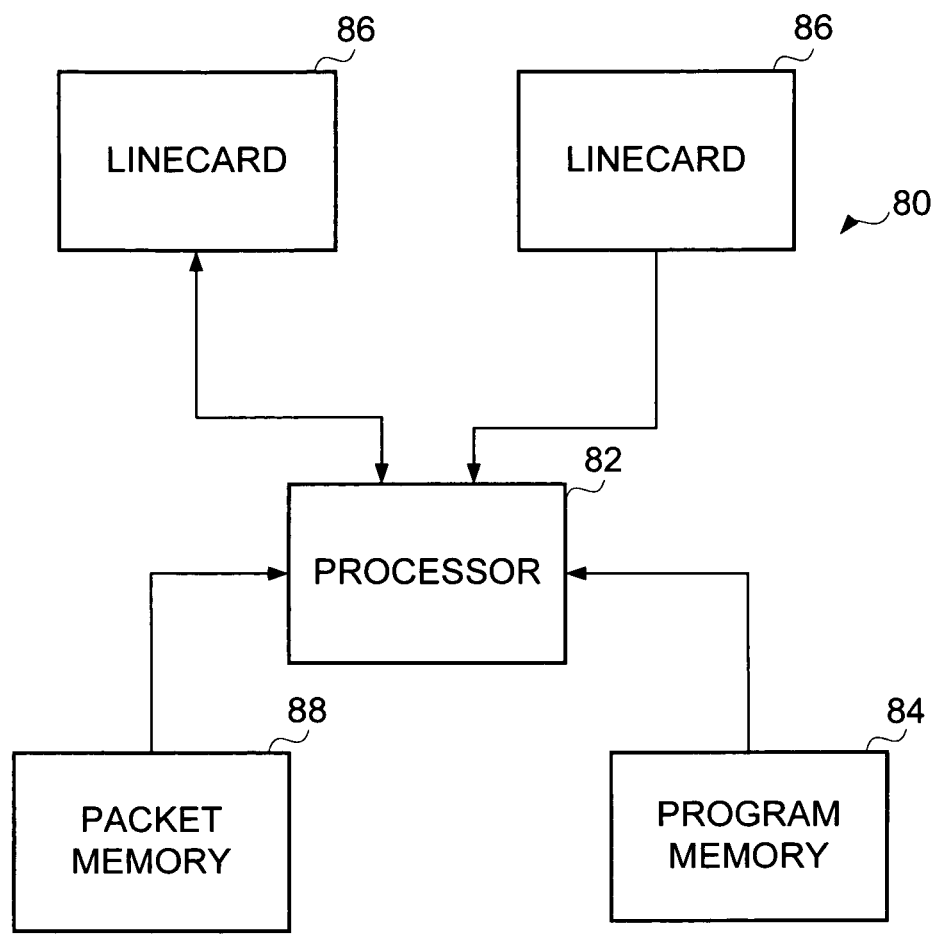
FIG. 5 depicts an example of a network device useful in implementing embodiments described herein.

FIG. 5 depicts a network device 80 that may be used to implement embodiments described herein. Network device 80 is configured to implement all of the network protocols and extensions thereof described above. In one embodiment, network device 80 is a programmable machine that may be implemented in hardware, software, or any combination thereof. Logic may be encoded in one or more tangible media for execution by a processor. For example, processor 82 may execute codes stored in a program memory 84. Program memory 84 is one example of a computer-readable medium. Program memory 84 can be a volatile memory. Another form of computer-readable medium storing the same codes is a type of non-volatile storage such as floppy disks, CD-ROMs, DVD-ROMs, hard disks, flash memory, etc.

Network device 80 interfaces with physical media via a plurality of linecards 86. Linecards 86 may incorporate Ethernet interfaces, DSL interfaces, Gigabit Ethernet interfaces, 10-Gigabit Ethernet interfaces, SONET interfaces, etc. As packets are received, processed, and forwarded by network device 80, they may be stored in a packet memory 88. To implement functionality according to the system, linecards 86 may incorporate processing and memory resources similar to those discussed above in connection with the network device as a whole. It is to be understood that the network device 80 shown in FIG. 5 and described above is only one example and that different configurations of network devices may be used.

As can be observed from the foregoing, the embodiments described herein provide numerous advantages. For example, hardware forwarding or software switching of traffic from virtual machines may be selected on a per virtual interface basis. Optimization of traffic forwarding within the virtual machine environment may be based on traffic patterns, feature configurations, hardware limitations, or other criteria. This may be done dynamically in order to quickly adapt to events such as migration of virtual machines with minimal traffic disruption.

Although the method and apparatus have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method comprising:
   communicating with a plurality of virtual machines located at a network device;
   assigning to each of said plurality of virtual machines, a mode of operation for forwarding data from said virtual machine to said plurality of virtual machines, said mode of operation selected from a hardware forwarding mode wherein said data is forwarded by a hardware implemented switch, and a software switching mode wherein said data is forwarded by a virtual switch at the network device;
   monitoring a destination of traffic from each of said plurality of virtual machines to identify whether said traffic is between said plurality of virtual machines at the network device or between said plurality of virtual machines at the network device and virtual machines located at another network device; and
   switching said assigned mode of operation at one or more of said plurality of virtual machines at the network device based on said monitored traffic;
   wherein forwarding data in said hardware forwarding mode comprises transmitting said data to a physical interface located at the network device and in communication with the hardware implemented switch, the hardware implemented switch physically independent from the network device.

2. The method of claim 1 wherein switching said assigned mode comprises dynamically switching said assigned mode based on operation of said one or more virtual machines at the network device.

3. The method of claim 2 wherein said dynamic switching is based on traffic patterns at said one or more virtual machines at the network device.

4. The method of claim 2 wherein said dynamic switching is based on configuration of said one or more virtual machines at the network device.

5. The method of claim 2 wherein said dynamic switching is based on availability of hardware resources.

6. The method of claim 1 wherein said virtual switch comprises logic encoded in one or more tangible media for execution and when executed is operable to forward said data from one of said virtual machines at the network device to another of said virtual machines at the network device, both of said virtual machines at the network device in said software switching mode.

7. The method of claim 1 wherein said hardware forwarding mode further comprises transmitting said data to a physical interface located at the network device and in communication with the hardware implemented switch.

8. The method of claim 7 wherein said interface comprises a plurality of virtual network tags, one of said virtual network tags associated with said virtual switch, and one or more of remaining said virtual network tags each associated with one of said virtual machines at the network device in said hardware forwarding mode.

9. The method of claim 1 wherein the network device is a server and the hardware implemented switch is physically independent of the server.

10. An apparatus configured for communication with a plurality of virtual machines, said apparatus comprising:
    a virtual switch in communication with one or more of said plurality of virtual machines;
    a physical interface in communication with one or more of said plurality of virtual machines and configured for communication with a hardware implemented switch, the hardware implemented switch physically independent from the apparatus;
    a mode selector for assigning to each of said plurality of virtual machines, a mode of operation for forwarding data from said virtual machine to said plurality of virtual machines, said mode of operation selected from a hardware forwarding mode wherein said data is forwarded by the hardware implemented switch, and a software switching mode wherein said data is forwarded by said virtual switch, and switching said assigned mode of operation at one or more of said plurality of virtual machines; and a monitor for monitoring traffic transmitted from said one or more of said plurality of virtual machines to identify whether said traffic is between said plurality of virtual machines at the network device or between said plurality of virtual machines at the network device and virtual machines located at another network device, said mode selected based on said monitored traffic;

wherein said one or more of said plurality of virtual machines in communication with said interface are in said hardware forwarding mode and said one or more of said plurality of virtual machines in communication with said virtual switch are in said software switching mode; and wherein said data is forwarded in said hardware forwarding mode by transmitting said data to the physical interface.

11. The apparatus of claim 10 wherein the mode selector is configured to dynamically switch between said modes based on operation of said one or more virtual machines at the network device.

12. The apparatus of claim 10 wherein the mode selector is configured to dynamically switch between said modes of operation based on traffic patterns recorded by the monitor.

13. The apparatus of claim 10 wherein said interface comprises a plurality of virtual network tags, one of said virtual network tags associated with said virtual switch and one or more of remaining said virtual network tags each associated with one of said virtual machines at the network device in communication with said interface.

14. The apparatus of claim 13 wherein the mode selector is configured to track the number of available virtual network tags and switch one of said virtual machines at the network device from said hardware forwarding mode to said software switching mode based on the number of available virtual network tags.

15. The apparatus of claim 10 wherein said virtual switch comprises logic encoded in one or more tangible media for execution and when executed is operable to forward said data from one of said virtual machines at the network device to another of said virtual machines at the network device, both of said virtual machines at the network device in said software switching mode.

16. The apparatus of claim 10 wherein the apparatus is configured such that switching between said modes does not occur until traffic patterns become stable.

17. Logic encoded in one or more non-transitory media for execution and when executed operable to:

communicate with a plurality of virtual machines located at a network device;

assign to each of said plurality of virtual machines, a mode of operation for forwarding data from said virtual machine to said plurality of virtual machines, said mode of operation selected from hardware forwarding mode wherein said data is forwarded by a hardware implemented switch, and a software switching mode wherein said data is forwarded by a virtual switch at the network device;

monitor a destination of traffic from each of said plurality of virtual machines to identify whether said traffic is between said plurality of virtual machines at the network device or between said plurality of virtual machines at the network device and virtual machines located at another network device; and switch said assigned mode of operation at one or more of said plurality of virtual machines at the network device based on said monitored traffic;

wherein said data forwarded in said hardware forwarding mode is transmitted to a physical interface located at the network device and in communication with the hardware implemented switch, the hardware implemented switch physically independent from the network device.

18. The logic of claim 17 wherein the logic is operable to dynamically switch between said modes based on operation of said one or more virtual machines at the network device.

19. The logic of claim 17 wherein the logic is operable to dynamically switch between said modes based on traffic patterns at said one or more virtual machines at the network device.

20. The logic of claim 17 wherein the logic is operable to dynamically switch between said modes based on availability of hardware resources.

* * * * *